United States Patent
Das et al.

(10) Patent No.: US 9,118,480 B2
(45) Date of Patent: Aug. 25, 2015

(54) FRAME QUALITY ESTIMATION DURING VITERBI DECODING

(71) Applicant: Telefonaktiebolaget L M Ericsson (publ), Stockholm (SE)

(72) Inventors: Sajal Kumar Das, Bangalore (IN); Aravindh Krishnamoorthy, Bangalore (IN); Deepak Menon, Bangalore (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 13/763,955

(22) Filed: Feb. 11, 2013

(65) Prior Publication Data

US 2014/0226765 A1     Aug. 14, 2014

(51) Int. Cl.
*H04L 27/06* (2006.01)
*H04L 1/20* (2006.01)
*H04L 1/00* (2006.01)

(52) U.S. Cl.
CPC .............. *H04L 1/203* (2013.01); *H04L 1/0054* (2013.01); *H04L 1/201* (2013.01)

(58) Field of Classification Search
CPC ........ H04L 1/203; H04L 1/0054; H04L 1/201
USPC .................. 375/316, 340, 341, 343, 344, 346
See application file for complete search history.

(56) References Cited

U.S. PATENT DOCUMENTS

| | | | |
|---|---|---|---|
| 6,029,268 A | 2/2000 | Kong et al. | |
| 6,170,073 B1 * | 1/2001 | Jarvinen et al. | 714/758 |
| 7,245,654 B2 | 7/2007 | Chang et al. | |
| 8,040,953 B2 | 10/2011 | Yang et al. | |
| 8,578,254 B1 * | 11/2013 | Yadav | 714/795 |
| 2003/0188252 A1 * | 10/2003 | Kim et al. | 714/779 |
| 2003/0219083 A1 * | 11/2003 | Graumann | 375/341 |
| 2009/0323868 A1 * | 12/2009 | Alt | 375/343 |
| 2010/0034325 A1 | 2/2010 | Abdallah et al. | |
| 2012/0185739 A1 * | 7/2012 | Simmons et al. | 714/704 |

FOREIGN PATENT DOCUMENTS

| | | | |
|---|---|---|---|
| EP | 1355430 B1 | 6/2005 | |
| EP | 1349313 B1 | 4/2012 | |

OTHER PUBLICATIONS

Viterbi, A. "Error Bounds for Convolutional Codes and an Asymptotically Optimum Decoding Algorithm." IEEE Transactions on Information Theory, vol. IT-13, No. 2, Apr. 1967, pp. 260-269.
Das, S. "Mobile Handset Design." John Wiley & Sons, Apr. 2010—Technology & Engineering, ISBN 978-0-470-82467-2, chapter 3: section 3.5.2.2 Decoding, pp. 86-196.
Nikolic-Popovic, J. "Using TMS320C6416 Coprocessors: Viterbi Coprocessor (VCP)." Texas Instruments, Application Report, SPRA750D—Sep. 2003, pp. 1-25.

* cited by examiner

*Primary Examiner* — Syed Haider
(74) *Attorney, Agent, or Firm* — Coats and Bennett, PLLC

(57) ABSTRACT

Methods and apparatus are disclosed for estimating a quality of a received data frame in a trellis decoder. The decoder utilizes a trellis diagram to depict the states and stages the decoder transitions through in search of a sequence of bits that closely resemble the received sequence. In the trellis diagram, each state at one stage is connected to a state at the next stage by a branch and a group of connected branches form a path. The decoder selects a winning path by comparing path metrics computed for each of the paths in the trellis diagram and outputs a most-likely sequence of hard bits from the winning path. A count of non-ideal branches over the winning path can be used for calculating the frame quality of the received data frame or the burst quality of a data burst in the received data frame.

18 Claims, 4 Drawing Sheets

FRAME QUALITY ESTIMATION DURING VITERBI DECODING

TECHNICAL FIELD

The present invention relates generally to quality estimation in a wireless receiver, and, more specifically, to generating a frame quality estimate of a received data frame and a burst quality estimate of a data burst in a received data frame during a Viterbi decoding process and deriving the bit error rate from the frame or burst quality estimates.

BACKGROUND

The transmission of digital information is subject to the adverse effects of the communication channel, such as co-channel and adjacent channel interference, noise, dispersion, and fading. These effects introduce bit errors into the transmitted data stream. The number of errors in a received data frame is sometimes measured as Bit Error Rate (BER) and Frame Erasure/Error Rate (FER). BER is defined as the ratio of the number of bits received in error to the total number of received bits. BER reflects the quality of a received data frame or block, which is useful in transport format selection, transmission rate selection, power control, link quality estimation, etc.

Besides BER, Frame Qualities (FQ) can be measured or estimated by the receiver for Bad Frame Indication (BFI), Adaptive Multi-Rate (AMR), Link Quality (LQ) measurement, or Bit Error Probability (BEP) computation. BFI indicates whether a decoded frame can be regarded as a bad frame that contains too many errors to be played by speech decoder. BFI usually is derived from a Soft Frame Quality (SFQ) estimate, which is often generated by a SFQ estimation module in a receiver. An SFQ estimate reflects the number of bits corrected by a decoder in a decoded data frame. If the number of corrected bits is higher than a threshold, the data frame is considered a bad frame and the binary BFI flag may be set to indicate to a higher layer whether this data frame can be used or not. For example, BFI=0 may indicate that the data frame contains meaningful information bits while BFI=1 may indicate that the number of corrected bits in the data frame exceeds the threshold. The data frame is not necessarily discarded because, in such condition, the corrections identified by the decoder may be incorrect.

The SFQ values generated by a SFQ estimation module can be used for many purposes. However, in prior art SFQ estimation procedures, an encoding process is needed to re-encode the decoded hard-bits. The re-encoded data is then compared with the soft bits that are output from the demodulator. Both the re-encoding process and the comparison process require extra computational power and additional memory resources, resulting in higher power consumption and unnecessary processing delays.

Further, prior art SFQ estimation modules produce a frame quality that is related to the actual soft bit frame quality in a complicated way. The relationship between the produced frame quality and the actual soft bit frame quality changes depending on the Signal to Noise Ratio (SNR) level, received power level, channel type or encoding rate, channel conditions, etc.

There is a need for simpler, faster, and more efficient SFQ estimation.

SUMMARY

Methods and apparatus are disclosed for estimating of a soft quality of a received data frame during a Viterbi decoding process. The soft quality of a received data frame may refer to the frame quality of the data frame or a burst quality of a data burst in the data frame. A Viterbi algorithm searches through a code trellis and finds a shortest path to generate a sequence of bits that most closely resembles a received sequence of bits, which is referred to as the most-likely sequence of bits in the disclosure hereafter. The present application discloses that the soft quality of a received data frame can be estimated by counting the number of non-ideal branches on the shortest path used to generate the most-likely sequence of bits.

In some embodiments, a method of estimating a soft quality of a received data frame in a receiver is disclosed. The receiver includes a Viterbi decoder or any trellis based decoder. The method comprises demodulating the received data frame to generate a sequence of soft bits and decoding the sequence of soft bits in the Viterbi decoder. During decoding, the Viterbi decoder selects a path to generate a most-likely sequence of bits. Along the selected path, a count of non-ideal branches is determined. The count of non-ideal branches is used to compute the soft quality of the received data frame. In some embodiments, a scaling factor is applied to the count of non-ideal branches to obtain the soft quality. Furthermore, the raw BER value (that means equalizer BER) can also be derived from this count of non-ideal branches with appropriate scaling factor.

In some embodiments, a burst quality for a data burst contained in the received data frame can be computed during the Viterbi decoding process of the received data frame. To compute a burst quality, bits that correspond to the data burst are identified. Then, along the path selected by the Viterbi decoder, each branch associated with the bits identified for the data burst is checked to see whether the branch is ideal or non-ideal. The non-ideal branches are counted and the burst quality of the data burst can be computed based on the number of non-ideal branches. For example, a scaling factor may be applied to the number of non-ideal branches.

Of course, the present disclosure is not limited to the features, advantages, and contexts summarized above, and those familiar with decoding techniques and devices will recognize additional features and advantages upon reading the following detailed description and upon viewing the accompanying drawings.

DETAILED DESCRIPTION

Figure 1:
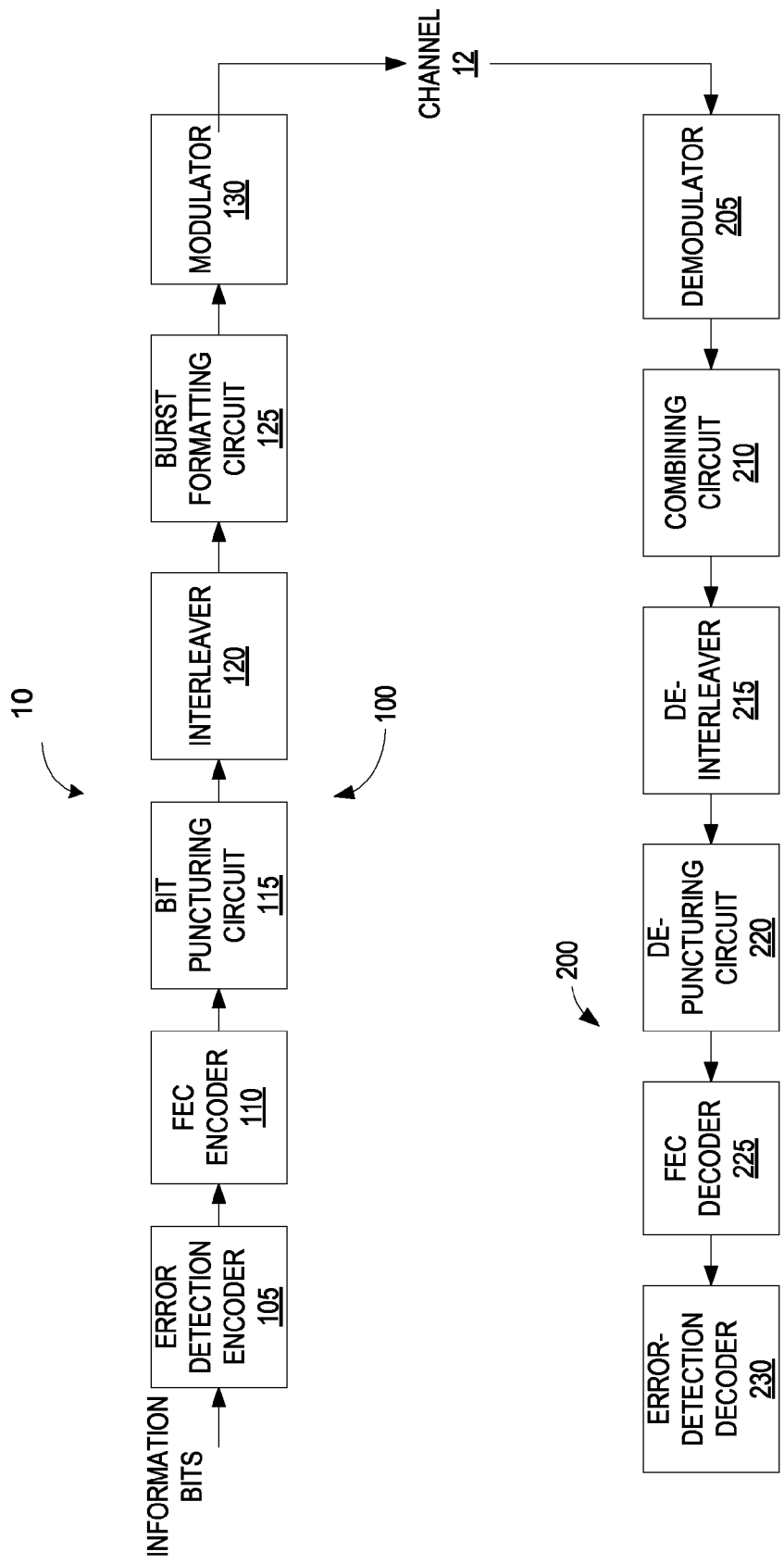
FIG. 1 illustrates an exemplary communication system including a transmitter and receiver.

Referring now to the drawings, FIG. 1 illustrates an exemplary wireless communication system 10 according to an exemplary embodiment of the invention. The exemplary communication system 10 operates according to the Global System for Mobile Communication (GSM) standard. Those skilled in the art will appreciate that the techniques described herein are applicable to communication systems that operate according to other standards, including the Wideband Code Division Multiple Access (WCDMA) standard and Long Term Evolution (LTE) standard.

The basic function of the communication system 10 is to send information over a communication channel 12 from a source that generates the information to one or more destinations. The communication system 10 comprises a transmitter 100 and receiver 200. At the transmitter 100, the information is converted into digital form and then transmitted over the communication channel 12 to the receiver 200. The transmission of the digital information is subject to the adverse effects of the communication channel 12, such as co-channel and adjacent channel interference, noise, dispersion, and fading. These effects introduce errors into the transmitted data stream. By use of various coding techniques, errors that may occur during transmission can be detected and corrected at the receiver 200.

In the exemplary embodiment show in FIG. 1, the transmitter 100 comprises an error detection encoder 105, Forward Error Correction (FEC) encoder 110, bit puncturing circuit 115, interleaver 120, burst formatting circuit 125, and modulator 130. Information bits to be transmitted are input to the error detection encoder 105, such as a Cyclic Redundancy Check (CRC) encoder. The error detection encoder appends error detection bits, e.g. CRC bits, to the information bits to enable detection of uncorrected bit errors at the receiver 200 as hereinafter described. The information bits along with the appended check code are then encoded by the FEC encoder 110 to generate a coded bit sequence. The FEC encoder 110 may, for example, comprise a convolutional encoder.

In some embodiments of the invention, the bit puncturing circuit 115 may delete or puncture selected bits from the coded bit sequence output from the FEC encoder 110. The coded bits remaining after puncturing are input to the interleaver 120. The interleaver 120 scrambles the coded bits to prevent concentrated transmission errors. After puncturing and interleaving, the coded bits are input to the burst formatting circuit 125.

The burst formatting circuit 125 divides the coded bits output from the interleaver into data blocks or data frames of a predetermined size. Each data block or data frame is transmitted over four time slots. The burst formatting circuit 125 formats the coded bits in the data block or data frame into four data bursts to be transmitted in respective time slots. The modulator 130 then separately modulates the four data bursts. After modulation, the data bursts are converted to analog signals and transmitted over the communication channel 12 to the receiver 200.

The receiver 200 comprises a demodulator 205, combining circuit 210, de-interleaver 215, de-puncturing circuit 220, FEC decoder 225 and error detection decoder 230. The received data bursts are demodulated by the demodulator 205 to obtain demodulated soft bits. The soft bits are combined by the combining circuit 210 to obtain a received data block or data frame. The bits of the received data block or data frame are de-interleaved by the de-interleaver 215 and de-punctured by the de-puncturing circuit 220 to obtain a coded bit sequence that generally corresponds to the coded bit sequence output by the FEC encoder 110 at the transmitter 100. The coded bit sequence output by the de-puncturing circuit 220 is input to the FEC decoder 225, which detects and corrects bit errors in the coded bit sequence. The FEC decoder 225 outputs an information bit sequence with an appended CRC code. The error detection decoder 230 uses the appended CRC code to detect any uncorrected bit errors. Assuming that any errors that occurred during transmission are corrected, the information bit sequence output by the FEC decoder 225 should be a replica of the information bit sequence that was transmitted.

In many instances, it is desirable to know the Soft Frame Quality (SFQ) or raw BER for the soft bits output from the demodulator 205 at the receiver 200. The SFQ or raw BER provides an indication of the channel conditions and is used for many purposes. To estimate the frame quality, the hard-bits output by the FEC decoder 225 may be re-encoded to obtain regenerated soft bits. The regenerated soft bits may then be compared to the received soft bits output by the demodulator 205 to determine the number of bits that have been corrected by the FEC decoder 225, that is, the number of bit errors in the received data frame. The number of bit errors is an indicator of the frame quality and can be used as a SFQ value. Alternatively, a mapping function may be used to map the raw BER to a corresponding SFQ value. However, the process of re-encoding the hard-bits and comparing the regenerated soft bits to the received soft bits is time consuming and resource intensive.

The present application provides a fast SFQ estimation method that does not require re-encoding decoded bits or comparing two sequences of bits. The fast SFQ estimation method is simple and efficient. It incurs minimum processing overhead and is easy to implement. The fast SFQ estimation method also saves power and reduces delay.

In some embodiments, the fast SFQ estimation method is performed during a Viterbi decoding process. Viterbi decoding is a common algorithm used for decoding signals that have been encoded using a convolutional code. For convolutional encoding, an information sequence is fed into the encoder k bits at a time. For each k bits input to the encoder, n bits (n>k) are output. The n output bits form a codeword selected from a set of codewords. Thus, a convolutional code represents a mapping of the k input bits into an n bit codeword selected from a codeword set C. One fundamental characteristic of a convolutional code is that each codeword output by the encoder is determined not only by the k input bits, but also by the information bits input during a previous coding interval. This dependence on the previous information bits causes the encoder to act like a finite state machine.

Figure 2:
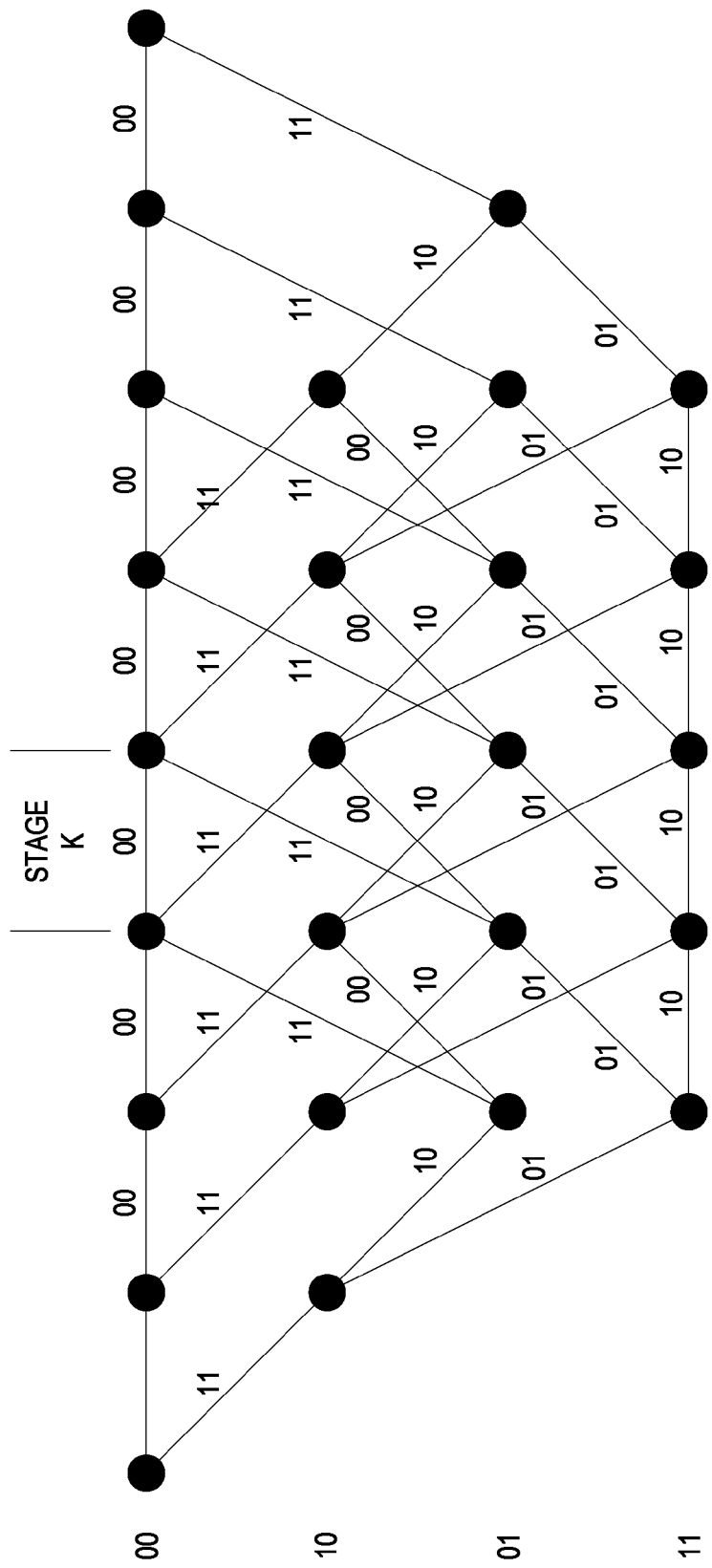
FIG. 2 illustrates an exemplary trellis for a convolutional code.

A trellis is commonly used to represent a convolutional code. FIG. 2 shows an exemplary trellis for a half-rate convolutional code where k=1 and n=2. During each coding interval, one bit is input to the encoder and two coded bits, referred to herein as a code symbol, are output. Each node of the trellis corresponds to a possible state of the encoder. In the example shown in FIG. 2, the encoder has four possible states. Each column of nodes in the trellis diagram represents a coding interval or stage. Transitions between states are represented in the trellis diagram as branches connecting nodes in adjacent coding intervals. Each branch is associated with a particular code symbol output by the encoder during a coding interval. In the example shown in FIG. 2, each code symbol comprises a pair of bits. A series of connected branches defines a path through the trellis. Each path represents a valid bit sequence.

Numerous techniques have been devised for decoding convolutional codes. The fundamental task implemented by each of these various approaches is essentially the same; to find a path through the trellis that is "closest" to the received bit sequence. The closest path corresponds to the valid bit sequence which has the highest probability of being transmitted given the received bit sequence.

For most convolutional codes, the number of possible paths through the trellis is quite large and it is therefore not possible to compute a path metric for every possible path through the trellis. Therefore, great effort has been expended in finding new algorithms that simplify the task of finding the closest path to the received bit sequence. One such algorithm is called the Viterbi algorithm.

In the Viterbi algorithm, the path with the lowest path metric is found by sequentially moving through the trellis from beginning to end and, at each stage, retaining one "survivor path" for each state or node. The survivor path is defined as the path leading up to a particular node that has the lowest accumulated path metric. An accumulated path metric for a survivor path is computed by summing branch metrics for each branch in the survivor path. For any given interval, there will be M survivor paths where M is the number of possible states or nodes. Once the survivor path is determined for each state, the survivor paths are extended to the next interval and the survivors for the next stage are determined. Recursion can proceed indefinitely without the number of surviving paths exceeding M. When the final stage is reached, the decoder determines which of the final survivor paths has the lowest accumulated path metric and outputs the corresponding bits.

Branch metrics may be computed as the Euclidean distance or Hamming distance between the valid code symbol associated with the branch and a received symbol. The following discussion focuses on branch metrics calculated as Euclidean distance. A person skilled in the art would appreciate that the techniques disclosed herein are equally applicable to other types of metrics.

For the half-rate code shown in FIG. 2, a received symbol may be presented in vector form as: $v_r=\{r_0,r_1\}$, where $r_0$ and $r_1$ are soft bits from the demodulator 205. A valid symbol associated with the branch may be represented as the vector which may be one of the following four vectors: $\{+1,+1\}$, $\{+1,-1\}$, $\{-1,+1\}$, $\{-1,-1\}$. The Euclidean distance between vector $v_r$ and vector $v_i$ can be expressed as:

$$D=(\vec{v}_r-\vec{v}_i)^2=\vec{v}_r^2-2\vec{v}_r\vec{v}_i+\vec{v}_i^2 \quad (1)$$

The Euclidean distance D represents the error between a received symbol and a valid code symbol and may be used as a branch metric BM. A path metric PM of a particular path can then be calculated as the sum of the branch metrics:

$$PM = \sum_i BM_i \quad (2)$$

where i represents an index to the branches on that path.

The branch metric computed during the Viterbi decoding process indicates how well a received symbol matches a code symbol. In an ideal scenario, for example, when the channel condition is excellent, branch metrics tend to be zero. This scenario may be referred to as "ideal match" situation. A branch is referred to as an "ideal" branch when its branch metric is zero, or below a pre-defined threshold. Otherwise, a branch is referred to as "non-ideal" branch.

An ideal branch indicates that the sequence or bits decoded for that branch match well with the received sequence. A non-ideal branch indicates that the generated sequence or bits that have been decoded do not match well with the received sequence. When the channel condition is good, most of branches are ideal branches because the received sequence is not affected by impairment or interference and the received sequence generally matches well with the transmitted sequence (as represented by the generated sequence at the receiver). On the other hand, under poor channel conditions or in the presence of strong interference, the number of non-ideal branches increases. Therefore, the number of non-ideal branches depends on the condition of the wireless channel a transmit signal propagates through.

Because the frame quality of a data frame or the burst quality of a data burst depends on the channel condition as well, the number of non-ideal branches and the frame quality are correlated. The following embodiment, the frame quality of the entire data frame is used as an example to illustrate how to calculate the frame quality based on the count of non-ideal branches over the entire winning path. Discussions about how to calculate the burst quality of a data burst in the data frame are also provided in a later section.

The relationship between the frame quality of a received data frame and the number of non-ideal branches on a winning path selected by the Viterbi decoder while decoding the received data frame can be expressed as SFQ=f(M), where M is the number of non-ideal branches on the winning path.

In some embodiments, SFQ is linearly related to f(M) by a scaling factor. For example, SFQ=α*M, where a is the scaling factor and M is the number of non-ideal branches on the winning path. The scaling factor can be derived empirically. Experiments have shown that one scaling factor may be carefully selected to suit all types of channel conditions at different SNR values in different interference scenarios. The channel condition may range from static to variable. Examples of variable channel conditions include the channel condition a driver experiences while driving through a typical urban neighborhood, rural area, or hilly terrain at different speeds, e.g. 50 km/h, 100 km/h, etc. The different interference scenarios may include co-channel interference or adjacent channel interference scenarios with varying Carrier-to-Interference ratio (CIR). The selection of the scaling factor may be depended on the hardware platform the FEC decoder 205 is operating on. The scaling factor may be tuned during configuration in accordance with the hardware characteristics of the platform. Empirical data show that the scaling factor α is often within the range between 0.6 and 1.0. Under certain conditions, the optimal value of α may be set to 0.8.

As mentioned above, the frame quality of a data frame can be measured in different ways, one of which is raw Bit Error Rate (BER) of the soft bits output by the modulator 205. Similar to SFQ, the raw BER of a data frame may be also linearly related to the number of non-ideal branches on the winning path selected by the decoder during decoding. The raw BER can be expressed as:

$$BER=\beta*M \quad (3)$$

where β is a scaling factor that ranges from 0.0014 to 0.002. Under certain conditions, the optimal value of β may be set to 0.0016.

Figure 3:
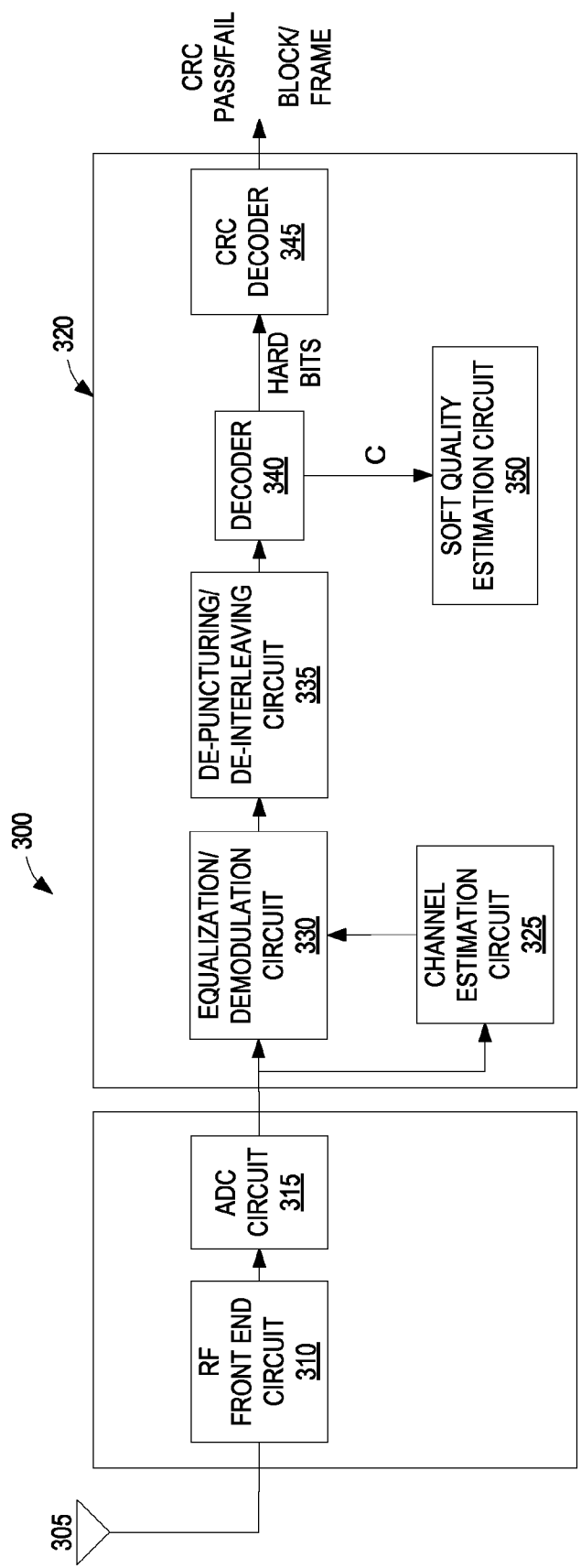
FIG. 3 illustrates an exemplary receiver configured for fast Soft Quality estimation during Viterbi decoding.

FIG. 3 illustrates a receiver 300 that is configured to carry out the above described method for computing a frame quality or raw BER of a data frame using a count of the non-ideal branches on the winning path selected by a Viterbi decoder while decoding the data frame. The receiver 300 comprises one or more receive antennas 305, an RF front end circuit 310, analog-to-digital converter (ADC) circuit 315, and baseband processing circuit 320. The RF front end circuit 310 filters, amplifies, and down converts signals received by the antennas 305 to baseband frequency. The ADC 315 converts the analog baseband signals into digital form for processing by the baseband processing circuit 320.

The baseband processing circuit 320 comprises a channel estimation circuit 325, an equalization/demodulation circuit 330, de-puncturing/de-interleaving circuit 335, decoder 340, CRC decoder 345, and soft quality estimation circuit 350. The received signal, after conversion into digital form, is input to the channel estimation circuit 325 and equalization/demodulation circuit 330. The channel estimation circuit 325 computes an estimate of the channel between the transmitter and receiver using known pilot symbols or training symbols in the received signal. The channel estimate is input to the equalization/demodulation circuit 330. The equalization/demodulation circuit 330 equalizes and demodulates the received signal using the channel estimates provided by the channel estimation circuit 325 to produce a received soft bit sequence in a received data frame (four data bursts). The received soft bits from the equalization/demodulation circuit 330 are input to the de-puncturing/de-interleaving circuit 335, which de-punctures and de-interleaves the demodulated soft bits. Soft bits from different bursts are combined into a single sequence of bits before being fed into the decoder 340 for decoding. The decoder 340 decodes the soft bits using a Viterbi algorithm to generate a hard estimate of the information bit sequence that was transmitted. The estimate output by the decoding circuit 340 comprises a hard bit sequence that is the closest to the received bit sequence. The decoder 340 also produces a count C of non-ideal branches over the winning path. The count C of the non-ideal paths is input to the soft quality estimation circuit 350 and is used to produce a SFQ or BER estimate. In some embodiments, the soft quality estimation circuit 350 scales the count C of non-ideal branches by a scaling factor to provide a SFQ and/or BER estimate. The hard bits generated by the decoder 340 goes through CRC checking at the CRC decoder 345 and will be passed to a higher layer if the checking does not fail.

In some embodiments of the invention, a burst quality may be estimated for each data burst included in a data block or data frame. For many logical channels, the coding scheme, puncturing pattern, and interleaving pattern are fixed and known to the receiver 300. Thus, the mapping of the coded bits output by the encoder to particular bursts is known. During the decoding process, the decoder 340 can use the known mapping to track the non-ideal frames for each burst in a data block or data frame. Measurements of burst quality or burst BER are useful. Often the quality of a data frame is indicated by one frame quality. However, the multiple data bursts contained in the same data frame may experience different channel conditions. The burst quality of each data burst may be different from each other and may be different from the frame quality. In many techniques, frame qualities are used to calculate weights. For example, in iterative channel estimation, a receiver iteratively processes a data burst to improve the channel estimate. Instead of using the frame quality to calculate a same weight for all the data bursts, using a burst quality to calculate a different weight for each data burst provides more accurate channel estimation. For another example, in frequency error estimation, the frequency error is estimated over each data burst and averaged over the entire data block or data frame. Suppose that there are four data bursts, and the frequency error for each data burst is: FE1, FE2, FE3, and FE4 respectively. Their corresponding burst qualities are: BQ1, BQ2, BQ3, and BQ4. Without burst qualities, the average frequency error can be expressed as

FE=(FE1+FE2+FE3+FE4)/4     (4)

With burst qualities, the average frequency error can be expressed as:

FE=(FE1*BQ1+FE2*BQ2+FE3*BQ3+FE4*BQ4)/4     (5)

In this way, each frequency error is weighted by the burst quality, giving more weight to the data bursts of higher qualities.

In some embodiments, burst qualities can be used to determine whether a burst is of sufficient quality to be used in correction algorithms, such as automatic frequency correction algorithm and automatic time correction algorithm. A threshold can be pre-determined. For instance, the threshold can be set to ¾ of the total number of bits in the data burst. If the burst quality is too low, that is, too many erroneous bits, the data burst will not be used in the correction algorithm.

Figure 4:
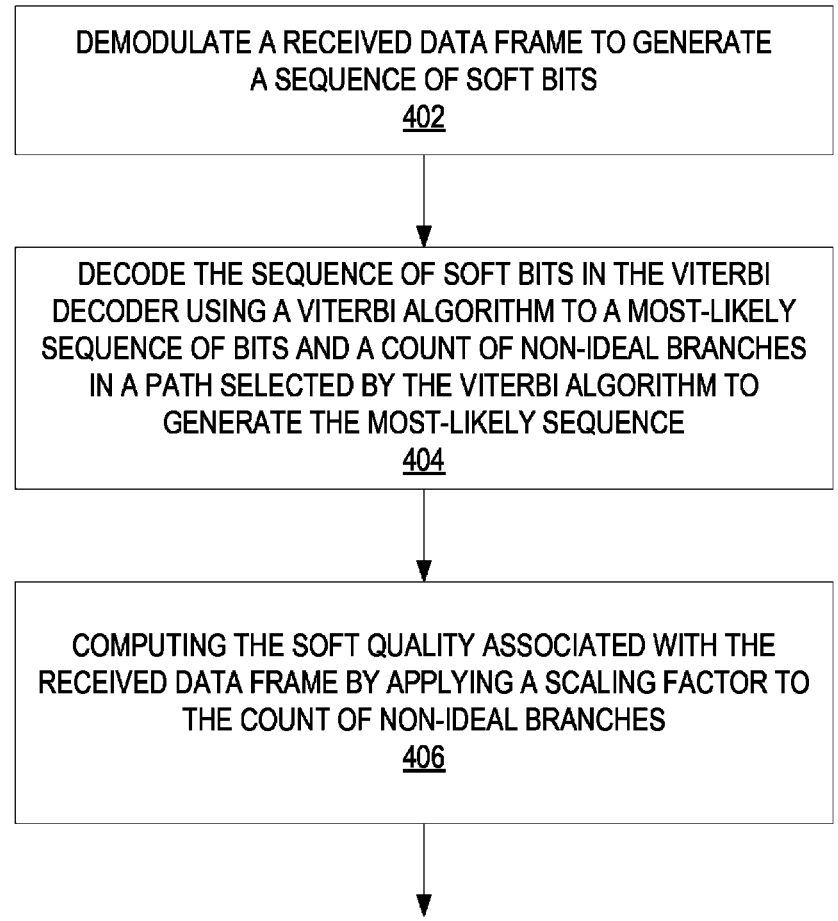
FIG. 4 is a flow chart illustrating an exemplary procedure for Soft Quality estimation.

FIG. 4 provides a flow chart of the soft quality estimation process described herein. In FIG. 4, a received data frame is demodulated to generate a sequence of soft bits (step 402). The sequence of soft bits is decoded in the Viterbi decoder to generate a most-likely sequence of bits and a count of non-ideal branches in a path selected by the Viterbi decoder to generate the most-likely sequence (step 404). The soft quality of the received data frame is computed by applying a scaling factor to the count of non-ideal branches (step 406). The soft quality of the received data frame may refer to the frame quality of the data frame, in which case the count of non-ideal branches includes all non-ideal branches in the selected path that corresponds to the data frame. The soft quality of the received data frame may refer to the burst quality of a data burst in the data frame. The burst quality of one particular data burst can be computed by applying the scaling factor to the count of non-ideal branches in the selected path that correspond to that particular data burst (step 406).

The foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed:

1. A method of estimating a soft quality associated with a received data frame by computing a burst quality of a data burst in the received data frame in a receiver including a decoder, said method comprising:
   demodulating the received data frame to generate a sequence of soft bits;
   decoding the sequence of soft bits in the decoder to generate a most-likely sequence of bits and a count of non-ideal branches in a path selected by the decoder to generate the most-likely sequence; and
   estimating the soft quality associated with the received data frame by:
      determining whether, on the selected path, each branch associated with the data burst is ideal or non-ideal;
      generating a total number of non-ideal branches associated with the data burst; and
      computing the burst quality for the data burst by applying a scaling factor to the generated total number of non-ideal branches.

2. The method of claim 1, wherein computing the soft quality associated with the received data frame comprises computing a frame quality for the entire data frame based on the count of non-ideal branches in the selected path corresponding to the data frame.

3. The method of claim 1, wherein the soft quality is a Soft Frame Quality (SFQ) of the received data frame.

4. The method of claim 3, wherein the scaling factor is within a range between 0.6 and 1.0.

5. The method of claim 1, wherein the soft quality is a Bit Error Rate (BER) of the received data frame.

6. The method of claim 5, wherein the scaling factor is within a range between 0.0014 and 0.002.

7. The method of claim 1, wherein the scaling factor is adjusted based on hardware characteristics of the receiver during configuration.

8. The method of claim 1, further comprising:
comparing the burst quality with a threshold; and
selecting the data burst for a correction algorithm if the burst quality is larger than the threshold.

9. The method of claim 8, wherein the threshold is defined as percentage of a total number of bits in the data burst.

10. The method of claim 8, wherein the correction algorithm is an automatic frequency correction or automatic time correction algorithm.

11. A receiver configured to calculate a soft quality associated with a received data frame by computing a burst quality of a data burst in the received data frame, said receiver comprises:
a demodulator for demodulating the received data frame into a sequence of soft bits;
a decoder for decoding the sequence of soft bits, said decoder configured to generate a most-likely sequence of bits and a count of non-ideal branches in a path selected by the decoder to generate the most-likely sequence, wherein the non-ideal branches comprise one or more branches having a branch metric above a predetermined threshold; and
a soft quality estimation circuit for estimating the soft quality of the received data frame by:
determining whether, on the selected path, each branch associated with the data burst is ideal or non-ideal;
generating a total number of non-ideal branches associated with the data burst; and
computing the burst quality for the data burst by applying a scaling factor to the generated total number of non-ideal branches.

12. The receiver of claim 11, wherein the soft quality of the received data frame is a frame quality for the entire received data frame and wherein the count of non-ideal branches is the number of non-ideal branches in the selected path corresponding to the entire data frame.

13. The receiver of claim 11, wherein the soft quality is a Soft Frame Quality of the received data frame.

14. The receiver of claim 13, wherein the scaling factor is within a range between 0.6 and 1.0.

15. The receiver of claim 11, wherein the soft quality is a Bit Error Rate of the received data frame.

16. The receiver of claim 15, wherein the scaling factor is within a range between 0.0014 and 0.002.

17. The receiver of claim 11, wherein the scaling factor is adjusted based on hardware characteristics of the receiver during configuration.

18. The receiver of claim 11, further configured to:
compare the burst quality with a threshold; and
select the data burst for a correction algorithm if the burst quality is larger than the threshold.

* * * * *